United States Patent Office 3,500,843
Patented Mar. 17, 1970

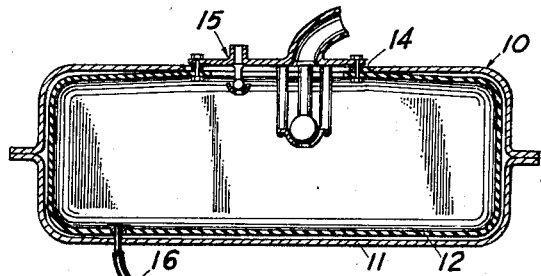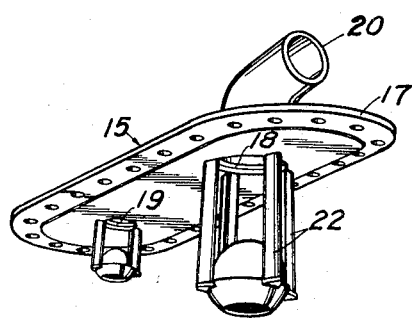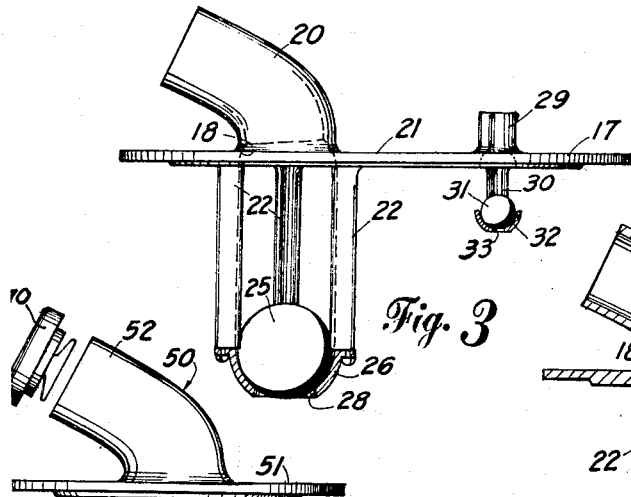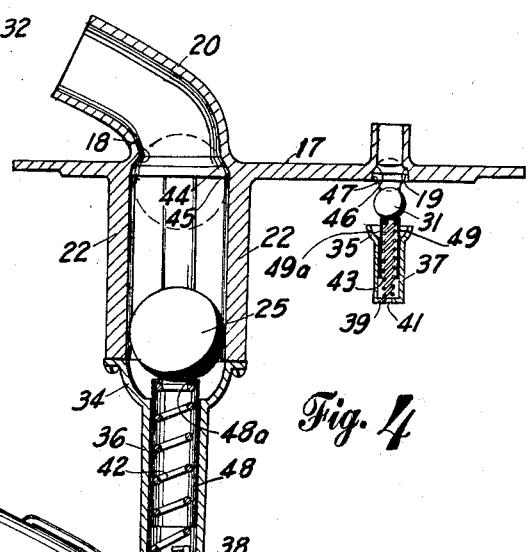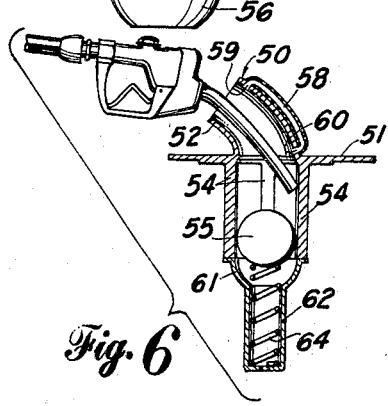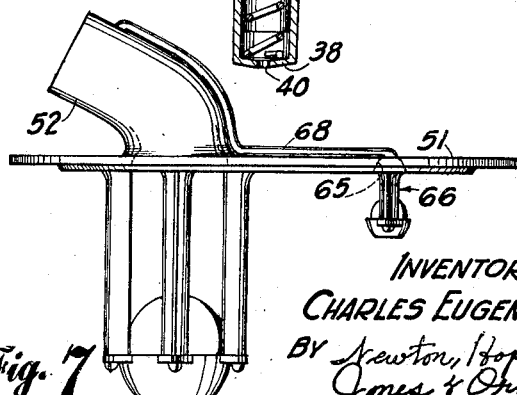
INVENTOR
CHARLES EUGENE WHITE
BY Newton, Hopkins,
Jones & Ormsby
ATTORNEYS

3,500,843
FUEL TANK ASSEMBLY WITH GRAVITY VENT VALVE
Charles Eugene White, 603 Chinquopin Drive, Marietta, Ga. 30060
Filed Oct. 2, 1967, Ser. No. 672,216
Int. Cl. F16k *17/36;* B65k *51/16;* B60k *15/02*
U.S. Cl. 137—43                                                                                                   8 Claims

ABSTRACT OF THE DISCLOSURE

A filler assembly for an automobile fuel tank comprising an inlet filling conduit communicating at one of its ends with the inside of the tank, a vent conduit communicating with the inside of the tank, a valve for selectively closing the inlet conduit, and a valve for selectively closing the vent conduit. The valves include a spring urged closure member which opens the conduit when the tank is in an upright position, but close the conduits when the tank is tilted further than sixty degrees from the horizontal.

BACKGROUND OF THE INVENTION

While various safety features have been developed for automobiles to protect the passengers as their vehicles move in traffic and on the expressways, when an accident does occur and a vehicle is inverted, as when an automobile turns over, there is usually danger of fire or explosion due to gasoline leakage from the gasoline storage tank of the automobile. The conventional automobile storage tank includes a fuel spout or conduit that extends from the upper portion of the tank in an upward direction. While the fuel conduit is usually capped to prevent gas leakage from the surging gasoline within the tank and evaporation of the gasoline, when an automobile is wrecked and overturned the fill conduit is frequently ruptured or even sheared from the gasoline storage tank, or the cap broken loose from the fill conduit. When the automobile is overturned, the opening which is usually in the upper portion of the tank is positioned in a downward direction and the gasoline is free to pour from its storage tank onto the highway or ground surface upon which the wrecked vehicle comes to rest. Thus, the hazard of spilled gasoline on the highway is added to the hazard of a wrecked vehicle being in or adjacent the flow of traffic. If the gasoline ignites, and it frequently does, the wrecked vehicle, its passengers and any other adjacent vehicles and people in the area may be subjected to the burning gasoline.

SUMMARY OF THE INVENTION

This invention relates to a fuel tank assembly which includes a fuel tank with an opening in its upper portion, an inlet conduit connected to the opening from outside the tank, and a valve connected to the opening from inside the tank. When the tank is inverted, or partially inverted, the valve closes the opening to prevent the fuel from being spilled from the tank. The construction is such that the valve inside the tank is independent of the fuel inlet conduit, so that if the inlet conduit is damaged or destroyed, the valve will continue to function.

In order that the inlet opening of the tank be closed before the fuel has a chance to be spilled from the tank, the valve is equipped with a spring which urges the closing element of the valve toward the inlet opening with enough force so that the closure element will close the inlet opening before the fuel tank is tilted as much as ninety degrees toward an inverted position. Therefore, the inlet opening of the fuel tank is closed even if the vehicle is only turned on its side.

Thus, it is an object of this invention to provide a fuel tank assembly for passenger vehicles, or the like, which prevents the inadvertent spillage of fuel when the vehicle is not maintained in an upright position.

Another object of this invention is to provide a fuel tank inlet conduit assembly for connection to the fuel tank of a passenger vehicle, or the like, wherein the conduit can be damaged or removed from the fuel tank and the fuel tank inverted without the loss of fuel.

Another object of this invention is to provide a fuel tank assembly for passenger vehicles, or the like, which prevents spillage or leakage of fuel from the fuel tank when the vehicle is inverted or severely tilted, and which is simple in construction, allows rapid filling of the fuel tank with fuel, and is economical to manufacture.

Other objects, features and advantages of the present invention will become apparent upon reading the following specification, when taken in conjunction with the accompanying drawing.

BRIEF DESCRIPTION OF THE DRAWING

FIG. 1 is a cross-sectional view of a fuel tank assembly, showing a fuel tank utilized with racing vehicles;

FIG. 2 is a bottom perspective view of the fuel tank inlet conduit assembly shown in FIG. 1;

FIG. 3 is a sole elevational view of the fuel tank inlet conduit assembly shown in FIG. 2;

FIG. 4 is a cross-sectional view, in side elevation, of a fuel tank inlet conduit assembly which is similar to the invention shown in FIGS. 1–3, but also includes spring means for urging the valves toward their closed position;

FIG. 5 is a side elevational view of a fuel tank inlet conduit assembly which is constructed for use with stock passenger vehicles;

FIG. 6 is a cross-sectional view, in side elevation, of a fuel tank inlet conduit assembly which is constructed for stock passenger vehicles, and includes a spring member for urging the valve toward its closed position;

FIG. 7 is a side elevational view of a fuel tank inlet conduit assembly for use with stock passenger vehicles, and includes an air vent that communicates with the fill conduit.

DESCRIPTION OF THE EMBODIMENTS

Referring now more particularly to the drawing, in which like numerals indicate like parts throughout the several views, FIG. 1 shows a fuel tank assembly 10 of the type commonly utilized with racing vehicles. Fuel tank assembly 10 includes outer rigid tank element 11 and inner flexible tank 12. Outer tank 11 defines an opening 14 in its upper portion, and fuel tank inlet conduit assembly 15 projects through opening 14 and is connected to inner tank 12. Fuel line 16 extends through the lower wall of outer tank 11 and communicates with the inner portion of inner tank 12.

As is shown in FIGS. 2 and 3, fuel tank inlet conduit assembly 15 includes platform 17 which defines fuel inlet opening 18 and vent opening 19. Fuel inlet conduit 20 communicates at one of its ends with inlet opening 18 on the upper or outer surface 21 of platform 17. Conduit 20 curves as it extends away from platform 17 so as to readily accommodate the nozzle of a fuel pump.

Four posts 22 are disposed about inlet opening 18 and extend downwardly or inwardly from the lower or inner surface 24 of platform 17. Valve element or closure member 25 is positioned between posts 22, and valve retaining cap 26 is connected to the lower ends of posts 22 to confine valve element 25 between the posts. Valve element 25 is spherical and the inner surfaces of posts 22 and the inner surface of cap 26 are concave, and conform in configuration to the outer surface of valve element 25. Cap 26 defines a bottom hole 28.

Cylindrically shaped overflow rim 29 extends from the outer surface 21 of platform 17 and is disposed about vent opening 19. Posts 30 are disposed on opposite sides of vent opening 19 and extend downwardly from inner surface 24 of platform 17. Valve element or closure member 31 is positioned between posts 30, and retaining cap 32 is connected between posts 30. Valve element 31 is spherical, and the inwardly facing surfaces of posts 30 and the inner surface of cap 32 conform in shape to the outer surface of valve element 31. Cap 32 also defines bottom hole 33.

As is shown in FIG. 4, retaining caps 26 and 32 can be replaced with caps 34 and 35. Caps 34 and 35 include cylindrical body portions 36 and 37, respectively, which extend downwardly from the concave portions of caps 34 and 35 and terminate in end closures 38 and 39 which define apertures 40 and 41, respectively. Coiled springs 42 and 43 are inserted in cylindrical body portions 36 and 37 and bottom on end closures 38 and 39, respectively. Sleeves 48 and 49, each having an inwardly extending flange 48a and 49a at their upper ends, are inserted over springs 42 and 43, into cylindrical body portions 36 and 37, respectively. The upper ends of springs 42 and 43 urge sleeves 48 and 49 upwardly, and these assemblies bias valve elements 25 and 31 toward their respective openings 18 and 19.

Openings 18 and 19 are circular and their diameters are generally equal to the diameters of their respective valve elements 25 and 31. In order for valve elements 25 and 31 to properly seat in openings 18 and 19, the openings are formed with two annular sealing surfaces, surfaces 44 and 45 in opening 18, and surfaces 46 and 47 in opening 19. Surfaces 44 and 46 are disposed closer to the outer surface 21 of platform 17 and are sloped to engage the upper portions of valve elements 25 and 31, while surfaces 45 and 47 are larger in thickness and diameter than surfaces 44 and 46 and are positioned generally intermediate outer and inner surfaces 21 and 24 of platform 17. Surfaces 45 and 47 are sloped to engage the portions of their valve elements immediately above the centerline of the valve elements. Thus, surfaces 44–47 function to provide a multiple sealing effect with valve elements 25 and 31, as the valve elements move into their closed position.

While FIGURES 1–4 illustrate fuel tank inlet conduit assemblies suitable for racing vehicles, FIGS. 5–7 illustrate fuel tank inlet conduit assemblies which are suitable for stock passenger vehicles. As is shown in FIG. 5, conduit assembly 50 includes platform 51, upwardly extending inlet conduit 52, downwardly extending posts 54, valve element 55, and cap 56. The elements are assembled in the same manner as the corresponding elements shown in FIGS. 1–4; however, conduit assembly 50 is substantially smaller in size than those previously described, and the presence of a separate vent opening is not usually required.

As is best shown in FIG. 6, conduit assembly 50 can be equipped with vent tube 58 which extends from port 59 in the upper or outer end of conduit 52 to port 60 in conduit 52 which is adjacent platform 51. Vent tube 58 functions to by-pass any air trapped in conduit 52 from port 60 up through port 59.

As is shown in FIG. 6, conduit assembly 50 can also be equipped with a modified cap 61 which includes a downwardly extending cylindrical body portion 62, which is similar to the previously described embodiments. Spring 64 functions to urge valve element 55 toward the opening in platform 51. A sleeve similar to sleeves 48 and 49 of FIG. 4 is not necessary for this species of the invention since the valve element is light enough to be properly seated in its seat by spring 64 alone.

While fill conduit 52 will be constructed with a substantially large internal diameter so as to accommodate the air that must escape from the fuel tank as the fuel is pumped into the tank, in some instances it may be desirable to construct inlet conduit 52 of a smaller diameter so that a separate vent opening in platform 51 is necessary. As is shown in FIG. 7, a separate vent opening 65 can be formed in platform 51 and a valve assembly 66 similar to those previously described can be suspended below vent opening 65. Vent tube 68 leads from vent opening 65 to a port adjacent the upper end of inlet conduit 52.

OPERATION

The inlet conduit assemblies shown in the drawing are connected to the fuel tank by means of bolts or rivets around the peripheries of the platforms of the assemblies, which extend through the platform and the fuel tank or its inner flexible liner. The inlet conduit assemblies of FIGS. 1–4 are connected to the inner flexible tank 12 of the racing vehicles, while the inlet conduit assemblies of FIGS. 5–7 are connected to the metal tanks of passenger vehicles. When the fuel tanks are to be filled with fuel, the cap is removed from the inlet conduit and a nozzle (FIG. 6) is inserted in the inlet conduit in the conventional manner. As the fuel flows from the nozzle, it is free to flow between the posts of the inlet conduit assembly and around the valve element, down into the tank. While fuel is normally pumped at a relatively high velocity, sufficient openings are present between the posts of the assembly to provide proper disbursement of the fuel. Also, the valve elements utilized are spherical and when the fuel impinges upon the valve element it tends to flow around the convex surface of the valve element. After the fuel tank has been filled, the nozzle is merely withdrawn in the usual manner and the cap 70 (FIG. 5) replaced on the inlet conduit.

As the vehicle is operated, the usual motion encountered in the tank by the movement of the vehicle will not be sufficient to affect the position the valve elements of any of the forms of the invention disclosed. If the vehicle is tilted to a position beyond sixty degrees from the horizontal, those conduit assemblies having their valve elements urged toward a closed position by springs (FIGS. 4 and 6) will be closed. If a vehicle having conduit assemblies without springs is tilted beyond ninety degrees, the force of gravity will cause the valve elements to move to their closed position. The structure is such that both the inlet conduit and vent opening of the conduit assemblies will be closed, leaving no opening through which the fuel can escape. Furthermore, since the posts of the conduit assemblies are supported from the inside surfaces of the platforms and the inlet conduits are supported from the outside surfaces of the conduits, the inlet conduits can be ruptured or severed completely away from the remaining elements of the assembly without affecting the function of the valves. Thus, if a vehicle has its fuel inlet conduit damaged and the vehicle is inverted, no loss of fuel will be experienced.

Since fuel is pumped at an excessively rapid rate into the tanks of racing vehicles, it is necessary to have a separate vent opening such as those shown in FIGS. 1–4 in the inlet conduit assemblies to provide for the rapid exhaust of the air trapped in the fuel tank. On the other hand, when a stock passenger vehicle is filled at a conventional service station, the entrapment of air in the fuel tank is usually not a problem. The trapped air can easily pass back through the inlet conduit while the nozzle of the gasoline pump is inserted therein. In order to assure the easy passage of the trapped air back through the inlet conduit, the inlet conduit can be constructed with an enlarged diameter. Also, an auxiliary vent tube, such as vent tube 58 of FIG. 6, can extend along the length of the inlet conduit to prevent entrapment of air in the conduit. With this arrangement, or with the use of an enlarged inlet conduit as shown in FIG. 5, only a single valve assembly is necessary to block the flow of fuel from the tank. In those instances where the air vent must extend through the surface of the support platform or tank, separate valves will be necessary to completely block the passage of fuel from the tank, as is shown in FIG. 7. In order to avoid evaporation of fuel from the tank, the vent opening is ducted outside the tank to the upper portion of the inlet conduit, so that the cap placed over the inlet conduit will block both the inlet conduit and the vent opening.

While the springs shown in FIGS. 4 and 6 have been described as being of sufficient strength to urge their respective valve elements into their closed positions when the fuel tank has been tilted beyond sixty degrees, it should be understood that springs of different characteristics can be utilized so that the movement of the valve elements is of different character. For instance, the springs may be of stronger compressive force so as to close the openings in the tank before the tank is tilted as much as sixty degrees. Furthermore, while under most circumstances the valve elements will be fabricated of polished steel, it is within the scope of this invention to utilize buoyant valve elements which will be lifted or floated into their respective closed positions by the surging of fuel inside the fuel tank. Also, while the valve elements have been illustrated as being spherical, it is deemed to be within the scope of this invention to utilize non-spherical valve elements. Furthermore, while posts have been utilized to guide the valve elements toward and away from their respective inlet openings, various other guide elements may be utilized. For instance, a cylindrical sleeve defining a plurality of apertures spaced throughout its length may be utilized.

It will be obvious that many variations may be made in the embodiment here chosen for the purpose of illustrating the present invention without departing from the scope thereof as defined by the appended claims.

I claim:

1. In an automobile fuel tank assembly of the type utilized to store gasoline for use in the engine of an automobile and comprising a substantially closed tank; a fuel line communicating with the lower portion of the tank and the engine; and a fuel inlet opening, the combination therewith of closing means for closing said inlet opening when the tank is pivoted toward an inverted position, said closing means defining a valve seat disposed about the inlet opening within the tank, valve guide means extending from the valve seat into the tank, and a closure member movable within the valve guide means toward and away from the valve seat under the influence of gravity to close and open the inlet opening.

2. The invention of claim 1 and further comprising spring means positioned within said valve guide means for urging said closure member toward said valve seat.

3. A fuel tank inlet conduit assembly of the type utilized with an automobile fuel tank comprising a support plate defining a fuel inlet opening, an inlet conduit communicating at one of its ends with the inlet opening and extending away from the opening in such a manner as to be suitable to guide fuel through the opening, inlet opening guide means positioned adjacent the opening on the other side of the support plate, and a valve closure member supported by the guide means and movable under the influence of gravity toward and away from the opening.

4. The invention of claim 3 wherein said support plate also defines a vent opening, vent opening guide means positioned adjacent the vent opening on the same side of the support plate with said inlet opening guide means, and a vent valve closure member supported by the vent opening guide means and movable under the influence of gravity toward and away from the vent opening.

5. The invention of claim 3 and further including spring means positioned by the guide means to urge the valve closure member toward the opening.

6. The invention of claim 5 wherein said spring means is constructed to urge the valve closure member into its closed position with respect to the opening when the support plate is tilted to an angle beyond sixty degrees with respect to the horizontal.

7. A fuel tank inlet conduit assembly of the type utilized with an automobile fuel tank comprising a support plate defining a fuel inlet opening, a fill conduit communicating at one of its ends with the inlet opening on one side of the platform, a plurality of guide posts surrounding the inlet opening on the other side of the platform, a valve retaining member held by the guide posts in spaced relationship with respect to the platform, and a valve closure member positioned between the guide posts and movable between the valve retaining member and the fuel inlet opening.

8. The invention of claim 7 wherein said valve closure member is spherical and said valve retaining member supports a coil spring in a position so as to urge the closure member toward the fuel inlet opening.

References Cited
UNITED STATES PATENTS

| | | | |
|---|---|---|---|
| 1,717,573 | 6/1929 | McAtee | 137—43 X |
| 2,104,461 | 1/1938 | Holm | 137—43 X |
| 2,194,348 | 3/1940 | Zoder | 137—43 |
| 2,528,600 | 11/1950 | Lombard | 137—43 |
| 2,613,013 | 10/1952 | Van Pelt. | |
| 2,935,075 | 5/1960 | Ringer | 137—43 |

CLARENCE R. GORDON, Primary Examiner

U.S. Cl. X.R.

220—44